(12) United States Patent
Fujii (10) Patent No.: US 7,503,420 B2
(45) Date of Patent: Mar. 17, 2009

(54) BICYCLE CONTROL DEVICE

(75) Inventor: Kazuhiro Fujii, Kawachinagano (JP)

(73) Assignee: Shimano Inc., Osaka (JP)

( * ) Notice: Subject to any disclaimer, the term of this patent is extended or adjusted under 35 U.S.C. 154(b) by 478 days.

(21) Appl. No.: 11/344,249

(22) Filed: Feb. 1, 2006

(65) Prior Publication Data

US 2007/0178715 A1  Aug. 2, 2007

(51) Int. Cl.
*B60K 26/00* (2006.01)
*F16C 1/10* (2006.01)

(52) U.S. Cl. ..................... 180/333; 74/502.2

(58) Field of Classification Search ........... 439/34, 439/138, 142, 521; 361/616, 617, 724, 725, 361/826, 600; 74/502.2, 502.4, 501.6, 469, 74/471 R; 180/333
See application file for complete search history.

(56) References Cited

U.S. PATENT DOCUMENTS

| | | | |
|---|---|---|---|
| 5,358,135 A | 10/1994 | Robbins et al. | |
| 6,015,036 A * | 1/2000 | Fukuda | 192/217 |
| 6,073,730 A | 6/2000 | Abe | |
| 6,078,015 A * | 6/2000 | Martinez | 200/61.85 |
| 6,129,580 A | 10/2000 | Kishimoto | |
| 6,142,281 A * | 11/2000 | Campagnolo | 192/217 |
| 6,216,078 B1 * | 4/2001 | Jinbo et al. | 701/70 |
| 6,227,068 B1 | 5/2001 | Masui et al. | |
| 6,370,877 B1 * | 4/2002 | Lin | 60/588 |
| 6,546,827 B2 | 4/2003 | Irie | |
| 6,695,090 B2 * | 2/2004 | McAllister | 180/333 |
| 6,718,843 B2 * | 4/2004 | Campagnolo | 74/502.2 |
| 6,802,231 B1 | 10/2004 | Wessel | |
| 6,830,363 B2 | 12/2004 | Pisula | |
| 7,100,471 B2 * | 9/2006 | Irie et al. | 74/502.2 |
| 2003/0000331 A1 | 1/2003 | Blaschke | |
| 2007/0193386 A1 * | 8/2007 | Fujii | 74/501.6 |
| 2007/0193387 A1 * | 8/2007 | Nakano | 74/501.6 |
| 2007/0193388 A1 * | 8/2007 | Nakano | 74/501.6 |
| 2008/0210046 A1 * | 9/2008 | De Perini | 74/502.2 |

FOREIGN PATENT DOCUMENTS

| | | |
|---|---|---|
| DE | 10 11 306 B | 6/1957 |
| DE | 199 22 327 A1 | 11/2000 |
| EP | 1 273 846 A1 | 1/2003 |
| EP | 1473220 A1 * | 11/2004 |
| EP | 1 524 179 A2 | 4/2005 |
| EP | 1535830 A2 * | 6/2005 |
| EP | 1582452 A2 * | 10/2005 |
| EP | 1588933 A2 * | 10/2005 |
| FR | 1 088 089 A | 3/1955 |

* cited by examiner

*Primary Examiner*—Paul N Dickson
*Assistant Examiner*—Daniel Yeagley
(74) *Attorney, Agent, or Firm*—Global IP Counselors, LLP (57) ABSTRACT

A bicycle control device is provided with a control lever and a lever bracket. The lever bracket is movably supporting the control lever. The lever bracket includes a bracket body and an electrical connector housing. The bracket body has a bicycle mounting portion and a control lever mounting portion. The electrical connector housing is movably supported on the bracket body between a retracted position and an accessible position.

19 Claims, 12 Drawing Sheets

BICYCLE CONTROL DEVICE

BACKGROUND OF THE INVENTION

1. Field of the Invention

This invention generally relates to control devices for bicycles. More specifically, the present invention relates to control devices for bicycles that include at least one electrical component or unit such as a switch, display unit, etc.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for shifting and braking.

In the past, bicycle shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electric switches have been used instead of mechanical control levers in order to operate the bicycle shifting mechanism. One example of an electrical shift control device is disclosed in U.S. Pat. No. 6,073,730. This patent discloses a pair of electric switches may be provided in the side of the bracket body. Another example of this type of electrical shift control device is disclosed in U.S. Pat. No. 6,129,580. The electrical shift control devices of these patents have an existing lever bracket that is equipped with an electrical connector housing. However, the electrical shift control devices of these patents do not include an electrical connector housing that is easily accessed to attach and detach electrical wires to the bicycle control device.

In view of the above, it will be apparent to those skilled in the art from this disclosure that there exists a need for an improved bicycle control device. This invention addresses this need in the art as well as other needs, which will become apparent to those skilled in the art from this disclosure.

SUMMARY OF THE INVENTION

One object of the present invention is to provide a bicycle control device that has an electrical connector housing in a bracket body such that rider can easily attach and detach electrical wires to the bicycle control device.

Still another object of the present invention is to provide a bicycle control device with an electrical connector housing in a bracket body such that the bicycle control device is relatively simple and inexpensive to manufacture and assemble.

The foregoing objects can basically be attained by providing a bicycle control device that basically comprises a control lever and a lever bracket. The lever bracket is movably supporting the control lever. The lever bracket includes a bracket body and an electrical connector housing. The bracket body has a bicycle mounting portion and a control lever mounting portion. The electrical connector housing is movably supported on the bracket body between a retracted position and an accessible position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
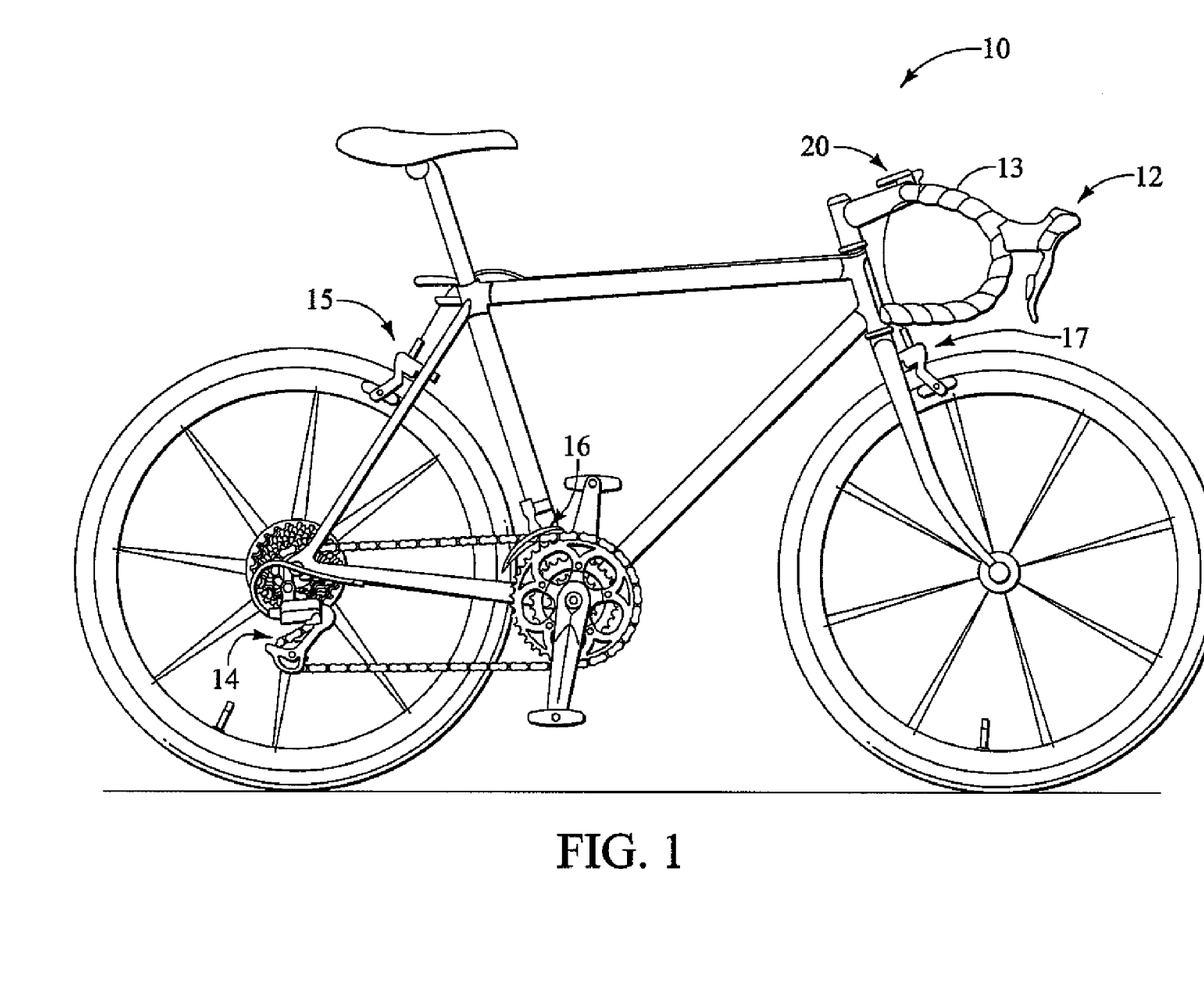
FIG. 1 is a side elevational view of bicycle equipped with a pair of bicycle control (brake/shift) devices (only one shown) coupled to a drop type handlebar in accordance with a preferred embodiment of the present invention.
Figure 2:
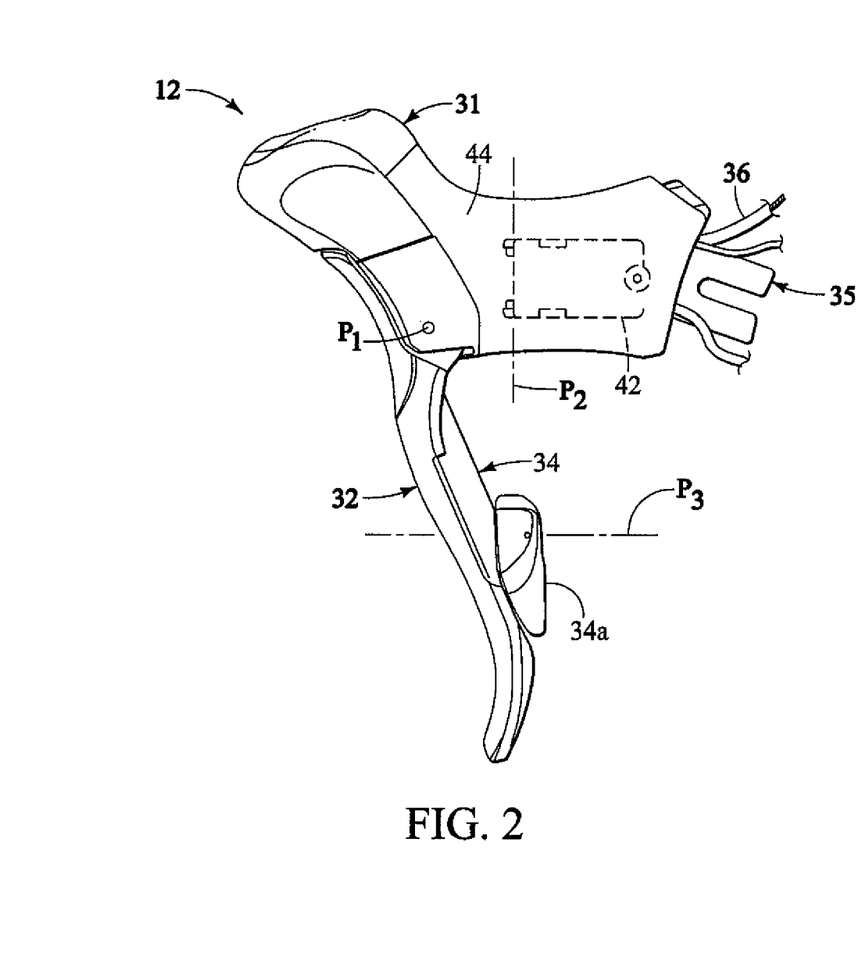
FIG. 2 is an inside elevational view of one of the bicycle control (brake/shift) devices in accordance with the present invention.
Figure 3:
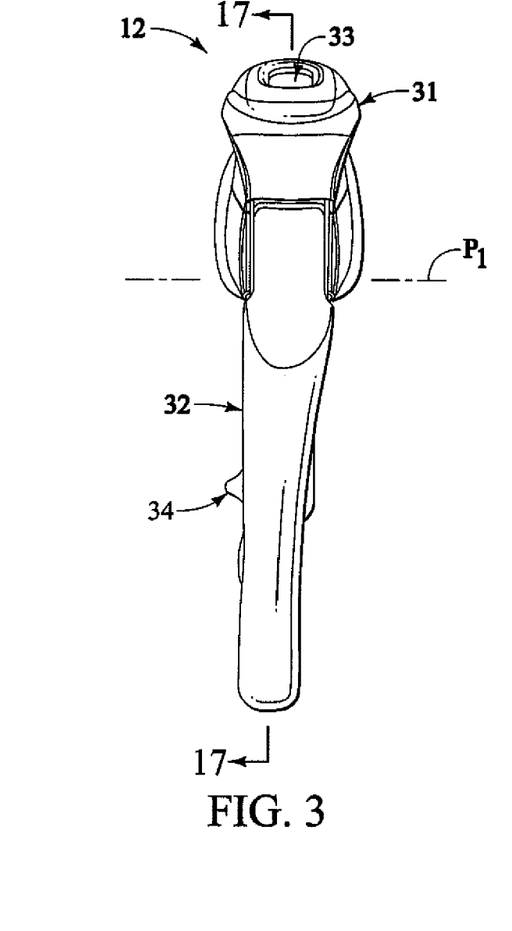
FIG. 3 is a front elevational view of the bicycle control (brake/shift) device illustrated in FIG. 2 in accordance with the present invention.
Figure 4:
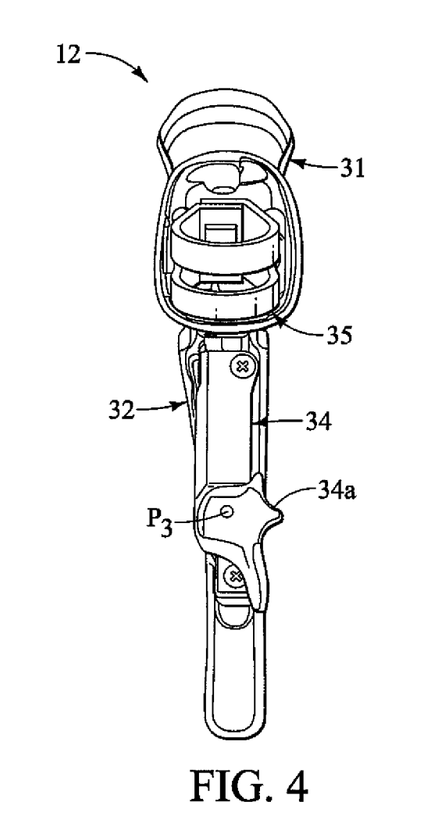
FIG. 4 is a rear elevational view of the bicycle control (brake/shift) device illustrated in FIGS. 2 and 3 in accordance with the present invention.

Referring initially to FIG. 1, a bicycle 10 is illustrated with a pair of control devices 12 (only one shown in FIG. 1) mounted in a bicycle handlebar 13 in accordance with one embodiment of the present invention. One of the control devices 12 is operatively coupled to a rear electronic derailleur 14 and a rear braking device 15, while the control device 12 is operatively coupled to a front electronic derailleur 16 via and a front braking device 17. The right and left hand side control devices 12 are essentially identical in construction and operation, except that they are mirror images. Thus, only one of the control devices 12 will be discussed and illustrated herein.

Since the parts of the bicycle 10 are well known in the art, the parts of the bicycle 10 will not be discussed or illustrated in detail herein, except for the parts relating to the control devices 12 of the present invention. Moreover, various conventional bicycle parts such as brakes, derailleurs, additional sprocket, etc., which are not illustrated and/or discussed in detail herein, can be used in conjunction with the present invention.

Preferably, a cycle computer 20 is operatively coupled between the control devices 12 and the rear and front electronic derailleurs 14 and 16. Alternatively, the cycle computer 20 can be eliminated such that the control devices 12 are directly electrically coupled to the rear and front electronic derailleurs 14 and 16. In such a case, each of the control devices 12 includes it own built in cycle computer. Also, the bicycle 10 is preferably provided with a generator such as a hub dynamo, and a battery which can be located in a portion of a frame tube such as the head tube of the bicycle 10. The generator and the battery are electrically coupled to the control devices 12 and the rear and front electronic derailleurs 14 and 16 in a conventional manner.

As best seen in FIGS. 2-6, the bicycle control device 12 basically comprises a lever bracket 31, a control (brake) lever 32 movably coupled to the lever bracket 31 about a pivot axis $P_1$ and an electrical unit 33 mounted within the lever bracket 31. In the illustrated embodiment of FIGS. 2-6, the bicycle control device 12 further includes an electrical shift switch 34. The lever bracket 31 is mounted to the bicycle handlebar 13 by a conventional tube clamp 35 that is attached to the rear end of the lever bracket 31. The tube clamp 35 is a conventional metal clamp and will not be discussed and/or illustrated in detail herein.

Figure 7:
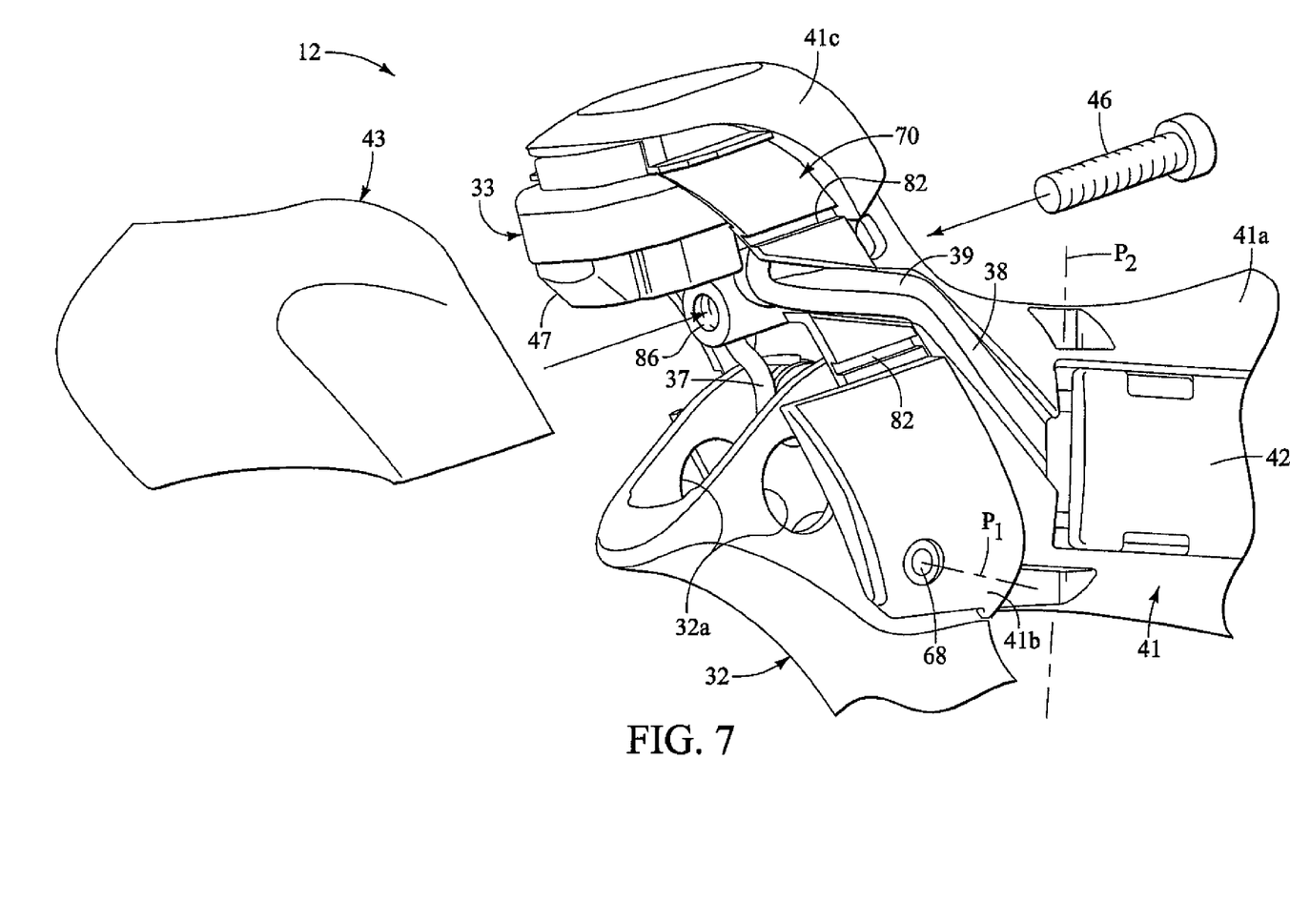
FIG. 7 is an enlarged partial exploded inside perspective view of the bicycle control device illustrated in FIGS. 2-6 in accordance with the present invention.
Figure 13:
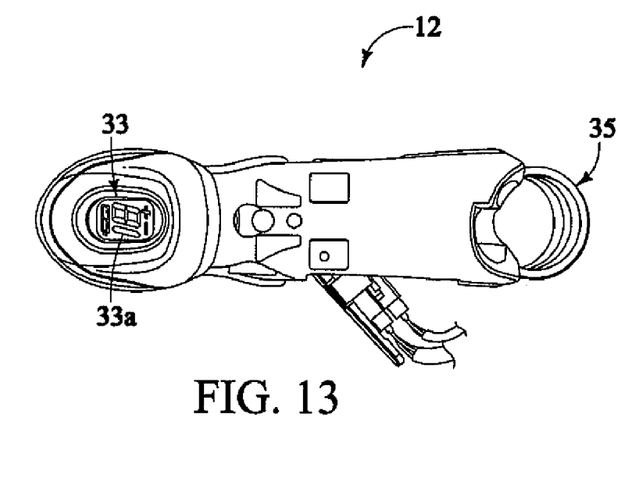
FIG. 13 is a top plan view of the bicycle control (brake/shift) device illustrated in FIGS. 2-12 in accordance with the present invention with the electrical cords illustrated in a connected state.

As best seen in FIGS. 7 and 13, the control (brake) lever 32 is a cable operated brake lever that is pivotally mounted to the bracket body 41 for performing a bicycle braking operation. In other words, the control lever 32 is attached to a brake cable 36 to operate one of the braking devices 15 and 17. In this illustrated embodiment, the electrical shift switch 34 is fixedly coupled to a lower end of the control lever 32 to move therewith. Alternatively, the control lever 32 can also be a hydraulically operated brake lever.

Figure 5:
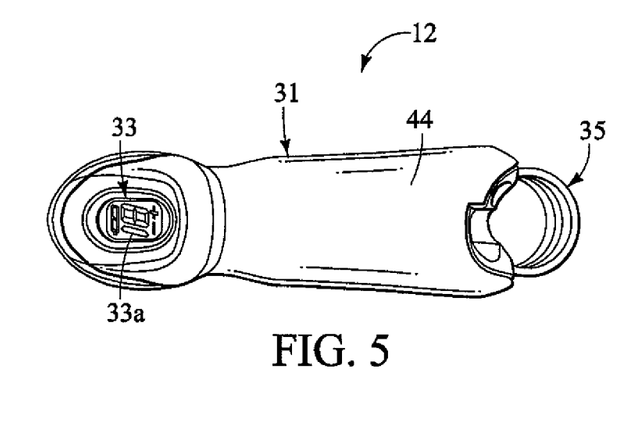
FIG. 5 is a top plan view of the bicycle control (brake/shift) device illustrated in FIG. 4 in accordance with the present invention.

As best seen in FIG. 5, the electrical unit 33 in this illustrated embodiment preferably includes an LCD display screen 33a for displaying various information such as shift or gear position of the control device 12 for the corresponding electronic derailleur 14 or 16 and/or battery level, etc. Preferably, the electrical unit 33 contains a microcomputer for relaying a shift signal from the electrical shift switch 34 to the corresponding electronic derailleur 14 or 16.

Figure 6:
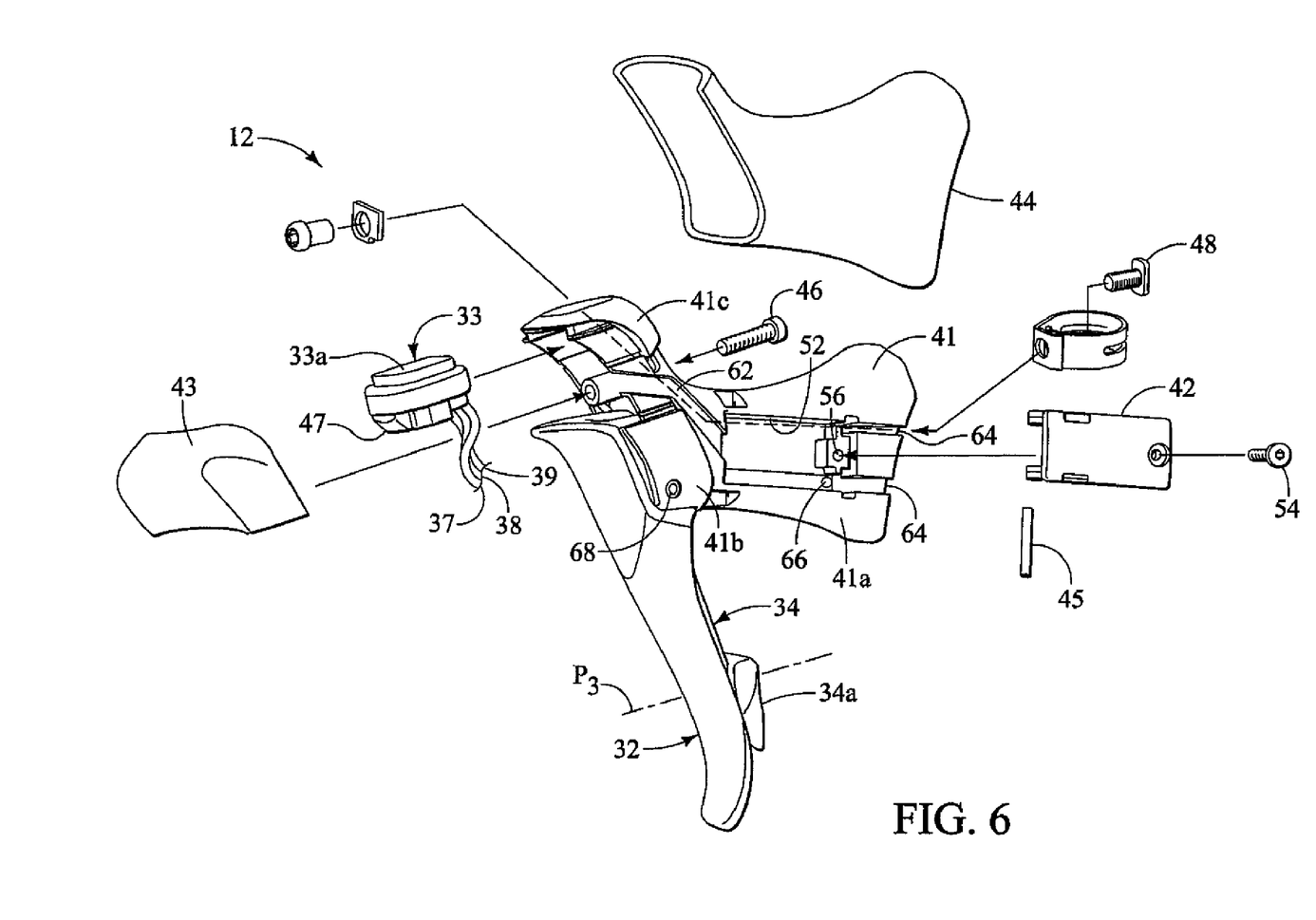
FIG. 6 is a partially exploded inside perspective view of the bicycle control device illustrated in FIGS. 2-5 in accordance with the present invention.

As best seen in FIGS. 6 and 7, the electrical unit 33 is preferably electrically connected to the electrical shift switch 34 by an electrical wire 37. This electrical wire 37 transmits an electrical signal from the electrical shift switch 34 to the electrical unit 33, which in turn sends a shift signal either directly or indirectly to the corresponding electronic derailleur 14 or 16 by an electrical wire 38. The electrical unit 33 is also preferably electrically connected to various sensors (not shown) such as a speed sensor, a torque sensor and the like by an electrical wire 39.

The lever bracket 31 basically includes a bracket body 41, an electrical connector housing 42, a bracket lid 43 and a flexible cover 44. As will become apparent from this disclosure, the lever bracket 31 of the control device 12 is configured and arranged with the electrical unit 33 being easily removed and replaced by detaching and reattaching the bracket lid 43 from the bracket body 41. As will become further apparent from this disclosure, the electrical connector housing 42 of the lever bracket 31 is configured and arranged such that electrical cables can be easily attached with and detached from the lever bracket 31.

The electrical connector housing 42 is pivotally coupled to the bracket body 41 by a pivot pin 45 to move between a retracted (storage or closed) position and an access (extended or open) position. The access (extended or open) position can be more generically considered as an accessible position configured and arranged to access the electrical connector housing 42. The bracket lid 43 is removably coupled to the bracket body 41 by a screw 46. The flexible cover 44 is a resilient elastomeric sleeve that is configured to overlie exterior surfaces of the bracket body 41 and the electrical connector housing 42. Such a structure allows a rider to easily attach (and detach) electrical cables to (from) the electrical connector housing 42 because the electrical connector housing 42 can protrude inwardly by pivotally rotating the electrical connector housing 42 relative to the bracket body 41. After pivoting the electrical connector housing 42 back into the bracket body 41, the flexible cover 44 covers the bracket body 41 and the electrical connector housing 42.

Figure 14:
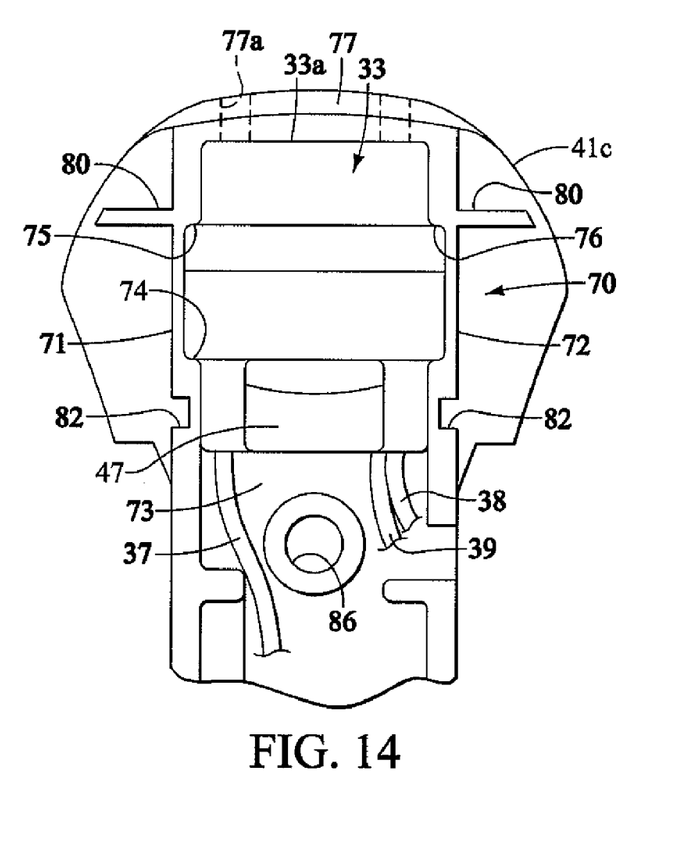
FIG. 14 is an enlarged, partial front elevational view of the bicycle control device illustrated in FIGS. 2-13 with the front bracket lid removed.

As seen in FIGS. 6 and 14, a resiliently compressible cushioning member 47 is disposed a forwardly facing surface of the electrical unit 33 for contacting the bracket lid 43. This resiliently compressible cushioning member 47 ensures that the electrical unit 33 is tightly retained against movement between the bracket body 41 and the bracket lid 43. Alternatively, the resiliently compressible cushioning member 47 can be fixed to a rearwardly facing surface of the bracket lid 43 or between the bracket body 41 and the electrical unit 33. In other words, a cushioning member is preferably provided to the electrical unit 33, the inside of the bracket lid 43 and/or the inside of the bracket body 41 to protect the electrical unit 33 and/or to eliminate backlash (i.e. gap) between the electrical unit 33 and the inner surface of the lever bracket 31.

The bracket body 41 basically includes a rearwardly located bicycle mounting portion 41a, a control lever mounting portion 41b and a forwardly located electrical unit mounting portion 41c containing the electrical unit 33. These portions 41a, 41b and 41c can be integrally formed as a one-piece, unitary member or from several individual pieces as needed and/or desired.

The bicycle mounting portion 41a has the conventional tube clamp 35 coupled by a bolt 48. The bicycle mounting portion 41a configured as a rider hand grip part. Thus, the bicycle mounting portion 41a of the bracket body 41 has a generally rectangular transverse cross section with rounded corner such that the bicycle mounting portion 41a includes an upper wall, a bottom wall and a pair of sidewalls defining an inside hollow area 50. The bicycle mounting portion 41a of the bracket body 41 has a connector housing recess 52 formed on the side surface or wall that faces the center plane of the bicycle 10 when installed on the handlebar 13. The connector housing recess 52 is configured and arranged to receive the electrical connector housing 42 when the electrical connector housing 42 is in the retracted position.

Figure 8:
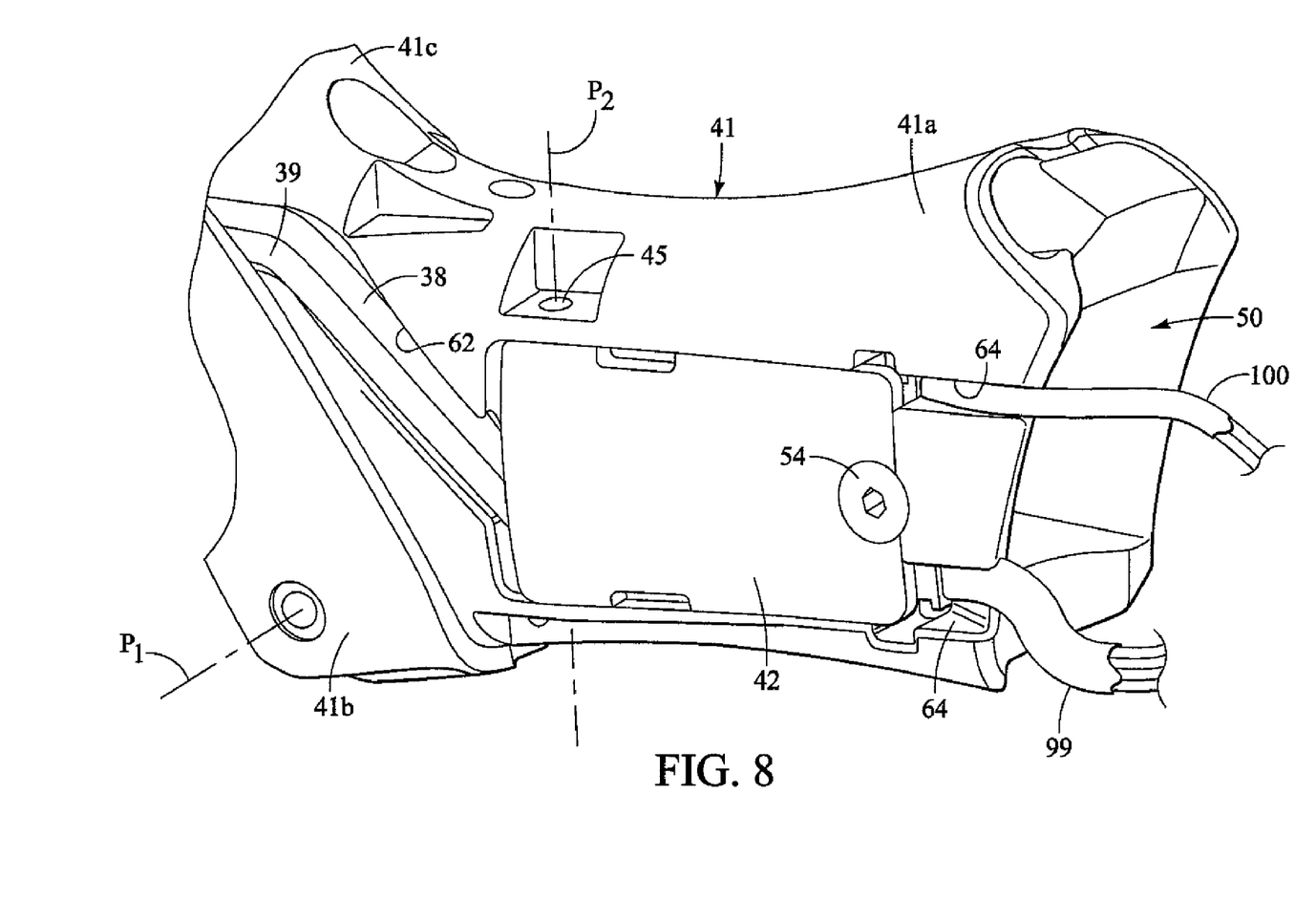
FIG. 8 is an enlarged partial inside perspective view of the bicycle control device illustrated in FIGS. 2-7 with the electrical connector housing in the storage (closed) position in accordance with the present invention.
Figure 9:
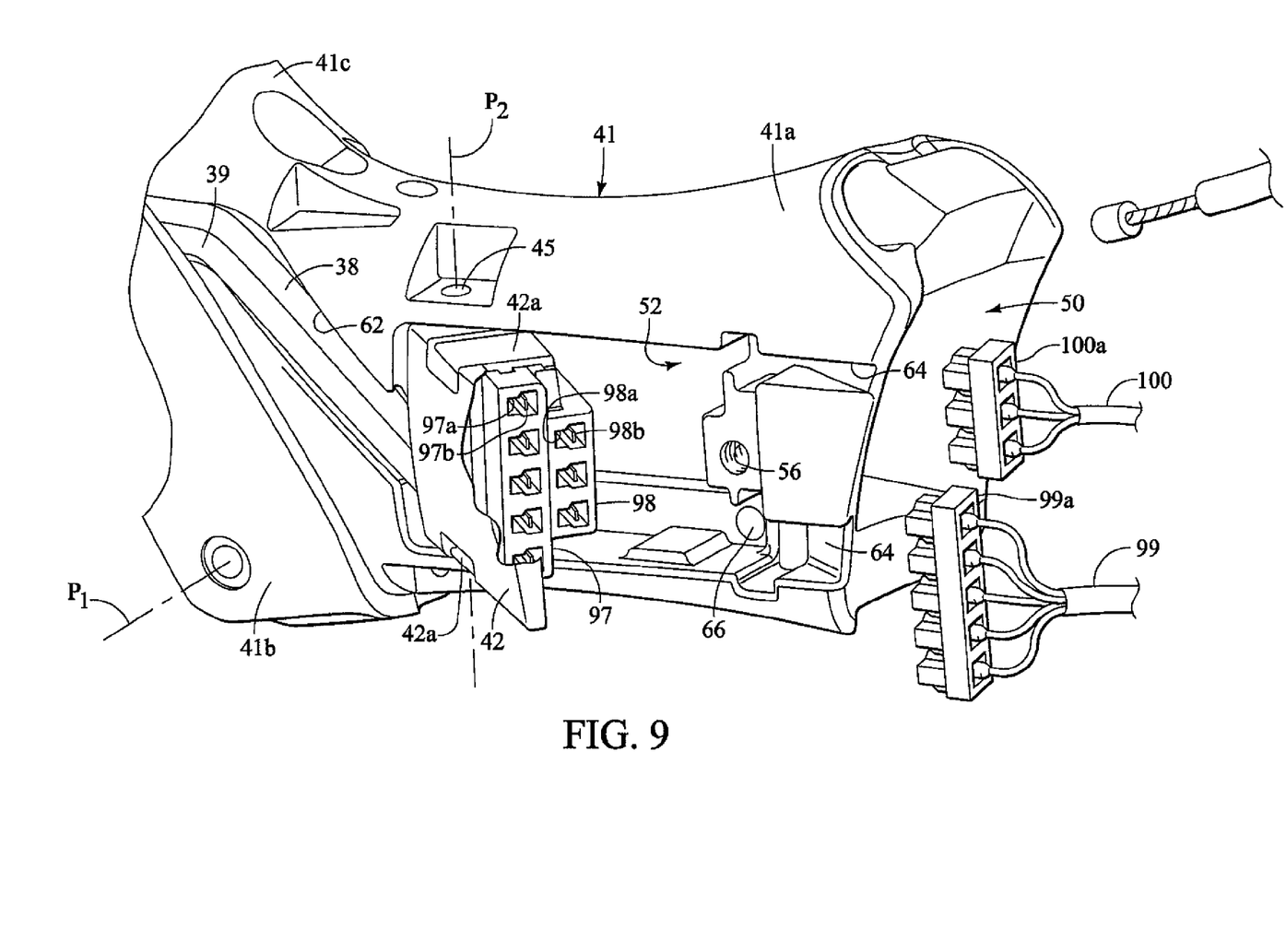
FIG. 9 is an enlarged partial inside perspective view, similar to FIG. 8, of the bicycle control device illustrated in FIGS. 2-8, but with the electrical connector housing in the extended access (open) position in accordance with the present invention.
Figure 10:
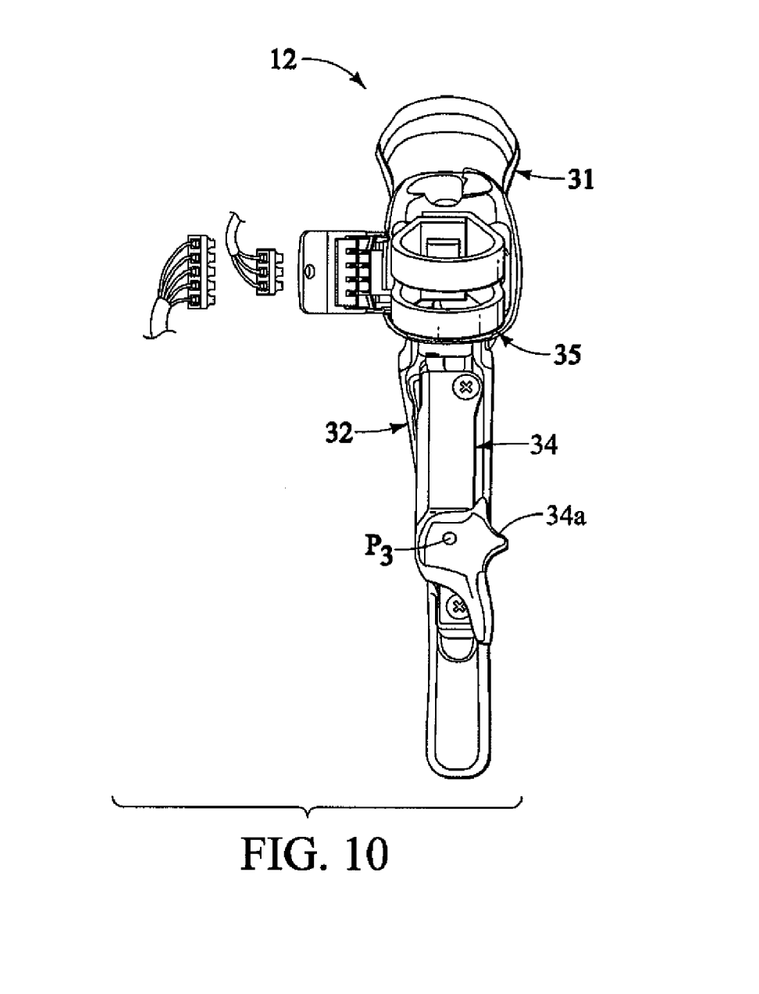
FIG. 10 is a rear elevational view of the bicycle control (brake/shift) device illustrated in FIGS. 2-9 in accordance with the present invention with the electrical cords illustrated in an unconnected state.
Figure 11:
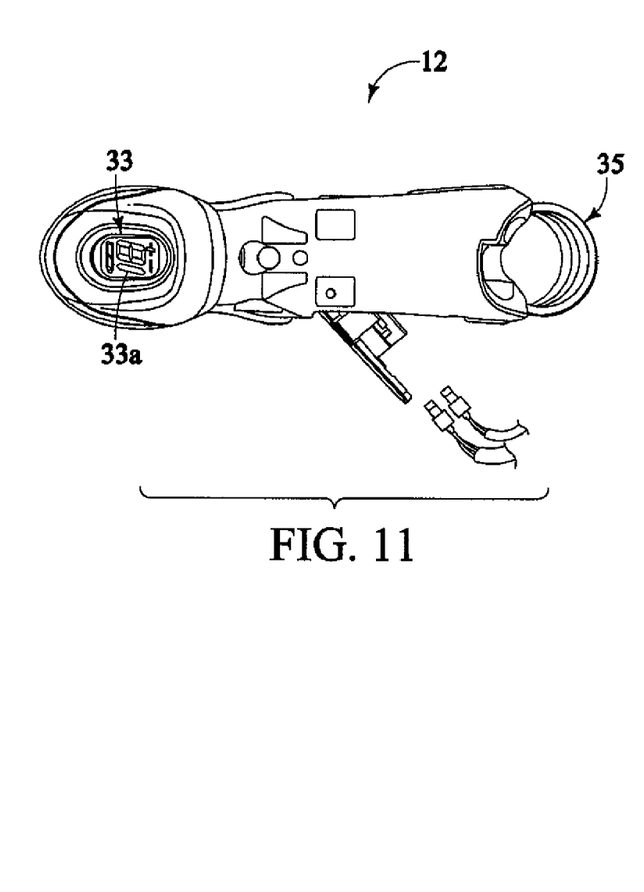
FIG. 11 is a top plan view of the bicycle control (brake/shift) device illustrated in FIGS. 2-10 in accordance with the present invention with the electrical cords illustrated in an unconnected state.
Figure 12:
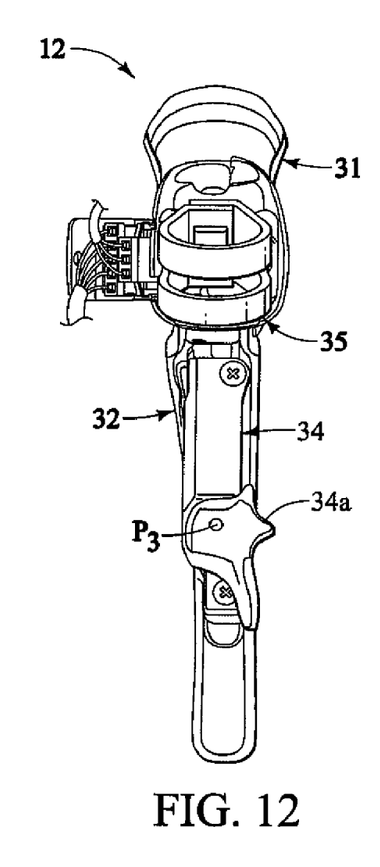
FIG. 12 is a rear elevational view of the bicycle control (brake/shift) device illustrated in FIGS. 2-11 in accordance with the present invention with the electrical cords illustrated in a connected state.

As mentioned above, the electrical connector housing 42 is pivotally coupled to the bicycle mounting portion 41a of the bracket body 41 by the pivot pin 45 to pivot about a pivot axis $P_2$ between the retracted position (FIG. 8) and the accessible position (FIG. 9). Preferably, the electrical connector housing 42 is secured in the retracted position (FIG. 8) by a screw or fastener 54 that threads into a threaded hole 56 formed in the bicycle mounting portion 41a of the bracket body 41. The electrical connector housing 42 has an exterior surface that is flushly arranged relative to an exterior surface of the bicycle mounting portion 41a of the bracket body 41.

As best seen in FIGS. 7 and 8, the bicycle mounting portion 41a of the bracket body 41 is also preferably provided with a forward wiring channel or groove 62 and a pair of rearward wiring channels or grooves 64. These channels 62 and 64 are dimensioned for receiving wiring that is connected to the electrical connector housing 42. The bicycle mounting portion 41a of the bracket body 41 also has a drainage hole 66 extending from the connector housing recess 52 to the inside hollow area 50. The drainage hole 66 is configured and arranged so that any water in the connector housing recess 52 is drained towards the inside hollow area 50.

The control lever mounting portion 41b pivotally supports the control (brake) lever 32 by a pivot pin 68. Preferably, the control lever mounting portion 41b has a pair of flanges that the control (brake) lever 32 is located between. In the illustrated embodiment of FIGS. 2-6, the control lever mounting portion 41b is integrally formed as a one-piece, unitary member with the bicycle mounting portion 41a and the electrical unit mounting portion 41c. In this illustrated embodiment, the electrical shift switch 34 is fixedly mounted to the control (brake) lever 32. Also, the electrical shift switch 34 has an operating member 34a with a pivot axis $P_3$. When the control (brake) lever 32 is configured and arranged as a shifter lever as in FIG. 18, discussed below, it is preferable that the control lever mounting portion 41b pivot relative to the bicycle mounting portion 41a about a shifting pivot axis that is perpendicular to the braking pivot axis $P_1$ of the pivot pin 68.

Turning now to FIGS. 6 and 14-16, the electrical unit mounting portion 41c is configured and arranged to mate with the bracket lid 43 to form an electrical unit receiving space therebetween for containing the electrical unit 33. As mentioned above, the bracket lid 43 is removably coupled to the electrical unit mounting portion 41c of the bracket body 41 by the screw 46.

Figure 15:
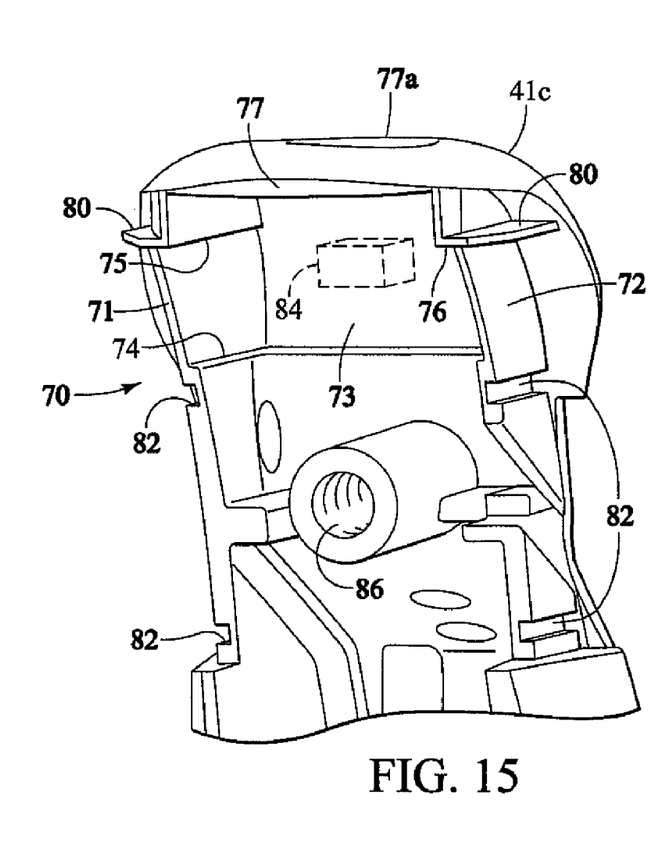
FIG. 15 is an enlarged, partial front perspective view of the bicycle control device illustrated in FIGS. 2-13 with the front bracket lid removed.
Figure 16:
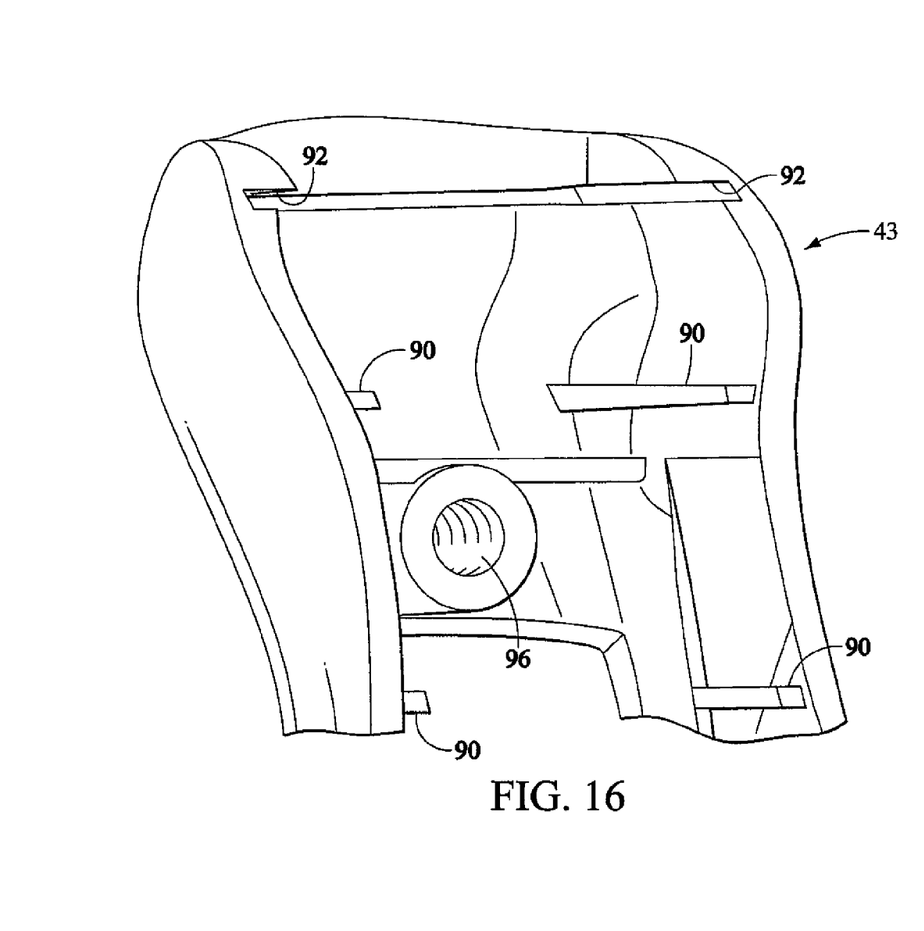
FIG. 16 is an enlarged interior perspective view of the front bracket lid for the bicycle control device illustrated in FIGS. 2-13 in accordance with the present invention.

The electrical unit mounting portion 41c of the bracket body 41 includes an electrical unit support structure 70 that supports the electrical unit 33 in the electrical unit mounting portion 41c of the bracket body 41 even when the bracket lid 43 is removed. The electrical unit support structure 70 includes a pair of lateral support members or walls 71 and 72 with a rear support member or wall 73 extending between the lateral support walls 71 and 72. The lateral support walls 71 and 72 effectively contribute to protection of the electrical unit 33 in the event that the bicycle falls over and the control device 12 hits the ground. The support members or walls 71 to 73 have a continuous lower ledge 74 that forms a lower support surface. The lower support surface formed by the lower ledge 74 that supports a bottom of the electrical unit 33. The lateral support walls 71 and 72 of the electrical unit support structure 70 further includes a pair of upper ledges 75 and 76 that form an upper abutment surface that is opposed to the bottom lower surface. Thus, each of the lateral support walls 71 and 72 has a channel defined by the upper abutment surface and the lower support surface. In other words, these ledges 74, 75 and 76 of the lateral support walls 71 and 72 slidably support the electrical unit 33. Thus, a bottom guide is formed on the inside of the electrical unit mounting portion 41c of the bracket body 41 to support the bottom portion of the electrical unit 33 with the lateral support walls 71 and extending vertically in order to support the electrical unit 33 even after the bracket lid 43 is removed.

The electrical unit mounting portion 41c includes a top wall or member 77 with an opening 77a that aligns with the LCD display screen 33a of the electrical unit 33. Thus, the LCD display screen 33a of the electrical unit 33 is arranged to be visible in normal use of the bicycle control device 12. The lateral support walls 71 and 72 and the top wall 77 form an electrical unit receiving space therebetween for receiving the electrical unit 33.

The lateral support walls 71 and 72 of the electrical unit mounting portion 41c further includes a pair of guide rails or projections 80 and two pairs of guide grooves or recesses 82 that form a slidable mating structure that engages the bracket lid 43. The slidable mating structure (the guide projections 80 and the guide grooves 82) support the bracket lid 43 on the bracket body 41 prior to fastening the bracket lid 43 to the bracket body 41 with the screw 46.

As seen in FIG. 15, a resiliently compressible cushioning member 84 is shown in broken lines on the rear support member or wall 73 for contacting the electrical unit 33. This resiliently compressible cushioning member 84 can be used instead of (or in addition to) the resiliently compressible cushioning member 47. This resiliently compressible cushioning member 84 can be fixed to a rearwardly facing surface of the electrical unit 33 or the rear support member or wall 73.

The electrical unit mounting portion 41c of the bracket body 41 further includes a threaded bore 86 for receiving the screw 46 to fasten the bracket lid 43 and the electrical unit mounting portion 41c of the bracket body 41 together. The threaded bore 86 is preferably located above the control lever 32 to avoid interference between the screw 46 and the control lever 32.

As best seen in FIG. 16, the bracket lid 43 is a plastic C-shaped member that is releasably coupled to a forwardly face of the electrical unit mounting portion 41c of the bracket body 41 to at least partially enclose the electrical unit 33 in the electrical unit mounting portion 41c of the bracket body 41. The bracket lid 43 includes two pairs of guide rails or projections 90 and a pair of guide grooves or recesses 92 that form a slidable mating structure that engages the guide projections 80 and the guide grooves 82 on the bracket body 41. In particular, the guide projections 90 of the bracket lid 43 engage the guide grooves 82 of the bracket body 41, while the guide grooves 92 of the bracket lid 43 engage the guide projections 80 of the bracket body 41. The slidable mating structures (the guide projections 80 and 90 and the guide grooves 82 and 92) support the bracket lid 43 on the bracket body 41 prior to fastening the bracket lid 43 to the bracket body 41 with the screw 46.

The bracket lid 43 further includes a threaded bore 96 for receiving the screw 46 to fasten the bracket lid 43 and the electrical unit mounting portion 41c of the bracket body 41 together. The threaded bore 96 is preferably located above the control lever 32 to avoid interference between the screw 46 and the control lever 32. Thus, the bracket lid 43 and the electrical unit mounting portion 41c of the bracket body are coupled together by screwing the screw 46 into the threaded bore 86 of the electrical unit mounting portion 41c of the bracket body 41 and the threaded bore 96 of the bracket lid 43. As long as at least a blind bore (i.e. the bore 96 of the bracket lid 43 in the embodiment) is configured and arranged to be a threaded bore, the other through bore (i.e. the bore 86 of the electrical unit mounting portion 41c in the embodiment) can be formed as a non-threaded bore.

Referring again to FIGS. 8-13, the inside surface of the electrical connector housing 42 preferably includes a main electrical connector 97 that forms a main electrical connector receiving section that mates with an end connector 99a of an electrical cable 99 via a press fit. The main electrical connector 97 can be either permanently secured to the inside surface of the electrical connector housing 42 or releasably secured snap-fit with mating snap-fit structures (not shown) formed on the inside surface of the electrical connector housing 42 and the main electrical connector 97. More preferably, the electrical connector housing 42 further includes an auxiliary electrical connector 98 in addition to the electrical connector 97. The auxiliary electrical connector 98 is releasably secured to the electrical connector housing 42 and the main electrical connector 97 by a pair of clips 42a. Thus, the bicycle control device 12 can be used with only the main electrical connector 97 or can be used with both the main electrical connector 97 and the auxiliary electrical connector 98. The auxiliary electrical connector 98 forms an auxiliary electrical connector receiving section that mates with an end connector 100a of an electrical cable 100 via a press fit.

The electrical connector housing 42 is preferably formed as a completely separate member from the electrical connectors 97 and 98 so that each of the electrical connectors 97 and 98 can be releasably attached to the electrical connector housing 42. In this manner, the electrical wires 38 and 39 easily can be attached to the main electrical connector 97 and the auxiliary electrical connector 98, respectively, and then installed in the electrical connector housing 42. Thus, the electrical connectors 97 and 98 and the electrical wires 38 and 39 can be easily attached, detached and then reattached to the electrical connector housing 42. Alternatively, the electrical connector housing 42 can be formed of a one-piece, unitary member from a plastic material that is molded with the electrical connectors 97 and 98 being either separate members attached to the electrical connector housing 42 or integrally formed with the electrical connector housing 42 as a one-piece, unitary member.

As mentioned above, the electrical connector housing 42 is pivotally coupled to the bicycle mounting portion 41a of the bracket body 41 by the pivot pin 45 to pivot about a pivot axis $P_2$ between the retracted position (FIG. 8) and the accessible position (FIG. 9). Preferably, the electrical connector housing 42 is secured in the retracted position (FIG. 8) by the screw or fastener 54 that threads into the threaded hole 56 formed in the bicycle mounting portion 41a of the bracket body 41. In the retracted position (FIG. 8), it is preferable that the exterior surface of the electrical connector housing 42 is flushly arranged relative to the exterior surface of the bicycle mounting portion 41a of the bracket body 41.

The main electrical connector 97 is a part that has at least one electrical contact insertion hole 97a with an electrical contact 97b disposed of the electrical contact insertion hole 97a. In the illustrated embodiment, the main electrical connector 97 has a plurality of the contact insertion holes 97a. The electrical contact 97b of the main electrical connector 97 mates with the end connector 99a of the electrical cable 99 via a press fit, and is electrically coupled to the electrical conductors of the wire 38. The electrical contact insertion hole 97a extends longitudinally between the bicycle mounting portion 41a and the control lever mounting portion 41b when the electrical connector housing 42 is in the retracted position. Thus, the electrical contact insertion hole 97a of the main electrical connector 97 substantially extends perpendicular relative to the pivot axis $P_2$ of the electrical connector housing 42 when the electrical connector housing 42 is in the retracted position.

Similar to the main electrical connector 97, the auxiliary electrical connector 98 is a part that has at least one electrical contact insertion hole 98a with an electrical contact 98b disposed in the electrical contact insertion hole 98a. In the illustrated embodiment, the auxiliary electrical connector 98 has a plurality of the contact insertion holes 98a. The electrical contact 98b of the auxiliary electrical connector 98 mates with the end connector 100a of the electrical cable 100 via a press fit, and are electrically coupled to the electrical conductor of the wire 39. The electrical contact insertion hole 98a extends longitudinally between the bicycle mounting portion 41a and the control lever mounting portion 41b when the electrical connector housing 42 is in the retracted position. Thus, the electrical contact insertion hole 98a of the auxiliary electrical connector 98 extends perpendicularly relative to the pivot axis $P_2$ of the electrical connector housing 42 when the electrical connector housing 42 is in the retracted position. Such an auxiliary electrical connector can be provided as an unused electrical connector at first. In other words, a user can use the auxiliary electrical connector 98 for an electrical device that is afterward equipped with his/her bicycle. Therefore, a bicycle control device according to the invention can be used as it stands (i.e. without exchanging it) even if a user adds a new electrical device later to his/her bicycle.

Figure 17:
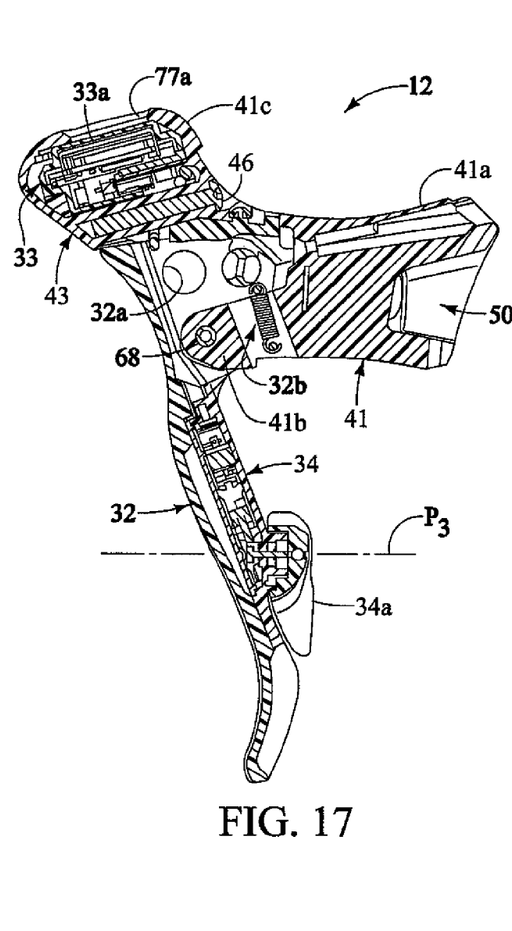
FIG. 17 is a cross sectional view of the bicycle control device illustrated in illustrated in FIGS. 2-13 in accordance with the present invention as seen along section line 17-17 of FIG. 3.

As seen in FIGS. 7 and 17, the control (brake) lever 32 has a pair of axially aligned openings 32a that receive an end barrel or fitting of the brake cable. In other words, the aligned openings 32a of the control lever 32 form a cable attachment structure for the brake cable. Thus, the control lever 32 is a cable operated brake lever that is pivotally mounted to the control lever mounting portion 41b of the bracket body 41 for performing a bicycle braking operation. As seen in FIG. 13, a return spring 32b is operatively coupled between the control lever 32 and the control lever mounting portion 41b to bias the control lever 32 to a rest position. The return spring 32b is preferably a coil tension spring that is elongated when the control lever 32 is moved from the rest position to a braking position. Of course, it will be apparent to those skilled in the art from this disclosure that the control lever 32 can be replaced with a dual action control (shifting/braking) lever is configured and arranged as a shift lever for controlling gear change.

Figure 18:
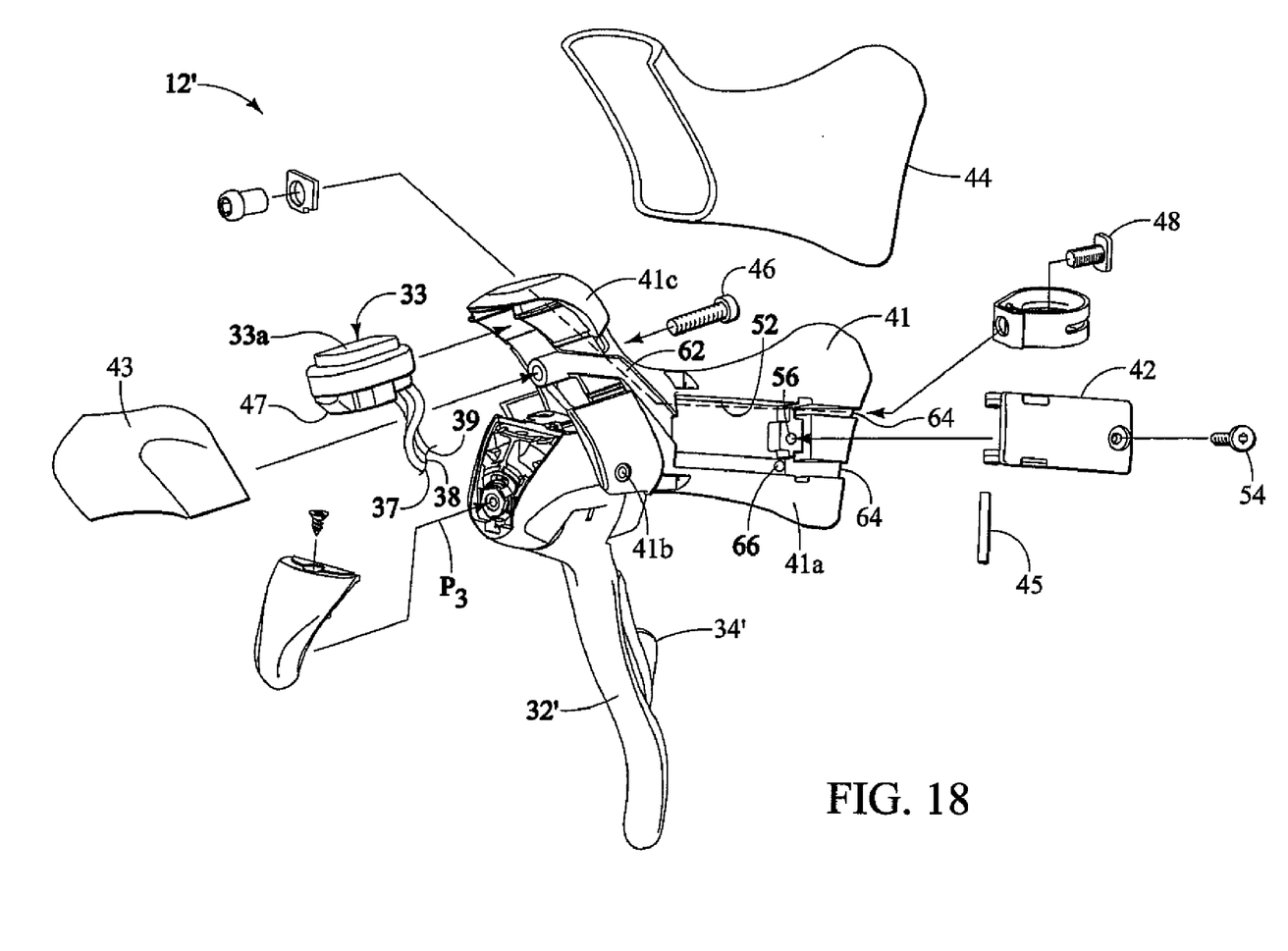
FIG. 18 is a partially exploded inside perspective view of a bicycle control device in accordance with a second embodiment of the present invention.

Referring now to FIG. 18, a partially exploded inside perspective view of a bicycle control (brake/shift) device 12' is illustrated in accordance with a second embodiment of the present invention. The bicycle control (brake/shift) device 12' is identical to the first embodiment, except that the control lever 32 and the switch 34 of the first embodiment have been replaced with a dual control (shift/brake) lever 32'. The dual control (shift/brake) lever 32' has a pivoting shift lever 34'. The dual control (shift/brake) lever 32' and the pivoting shift lever 34' pivot together relative to the bracket body 41 about a shifting pivot axis $P_3$ that is perpendicular to the braking pivot axis $P_1$. The dual control (shift/brake) lever 32' with the pivoting shift lever 34' operates in the same manner Shimano's ST-R700 dual control lever. Thus, the details of the construction and operation of the dual control (shift/brake) lever 32' with the pivoting shift lever 34' will be omitted.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
   a control lever; and
   a lever bracket movably supporting the control lever, the lever bracket including
      a bracket body with a bicycle mounting portion and a control lever mounting portion, and
      an electrical connector housing being movably supported on the bracket body between a retracted position and an accessible position;
   the electrical connector housing is pivotally coupled to the bracket body about a pivot axis to move between the retracted position and the accessible position.

2. The bicycle control device according to claim 1, wherein the electrical connector housing is configured and arranged to receive an electrical connector.

3. The bicycle control device according to claim 2, wherein the electrical connector includes a plurality of electrical contact holes that extend longitudinally between the bicycle mounting portion and the control lever mounting portion when the electrical connector housing is in the retracted position.

4. The bicycle control device according to claim 1, wherein the pivot axis of the electrical connector housing extends in a substantially perpendicular direction relative to a pivot axis of the control lever.

5. The bicycle control device according to claim 1, wherein the electrical connector housing includes an electrical connector that includes a plurality of electrical contact holes extending perpendicularly relative to the pivot axis of the electrical connector housing when the electrical connector housing is in the retracted position.

6. The bicycle control device according to claim 1, wherein the electrical connector housing includes an electrical connector and an auxiliary electrical connector.

7. The bicycle control device according to claim 6, wherein the electrical connector includes a plurality of electrical contact holes that extend substantially perpendicular relative to the pivot axis of the electrical connector housing when the electrical connector housing is in the retracted position.

8. The bicycle control device according to claim 7, wherein the electrical contact holes extend longitudinally between the bicycle mounting portion and the control lever mounting portion when the electrical connector housing is in the retracted position.

9. The bicycle control device according to claim 1, wherein the bracket body has a recess that is configured and arranged to receive the electrical connector housing when the electrical connector housing is in the retracted position.

10. The bicycle control device according to claim 1, wherein the bracket body includes an upper wall, a bottom wall and a pair of sidewalls defining an inside hollow area.

11. The bicycle control device according to claim 10, wherein one of the sidewalls of the bracket body has a recess that is configured and arranged to receive the electrical connector housing when the electrical connector housing is in the retracted position.

12. The bicycle control device according to claim 10, wherein one of the walls of the bracket body has a recess that is configured and arranged to receive the electrical connector housing when the electrical connector housing is in the retracted position.

13. The bicycle control device according to claim 12, wherein the bracket body has a drainage hole extending from the recess to the inside hollow area.

14. The bicycle control device according to claim 1, wherein the electrical connector housing has an exterior surface that is flushly arranged relative to an exterior surface of the bracket body.

15. The bicycle control device according to claim 14, wherein the lever bracket further includes a flexible cover that is configured to overlie the exterior surfaces of the bracket body and the electrical connector housing.

16. The bicycle control device according to claim 1, wherein the control lever is configured and arranged as a shift lever for controlling gear change.

17. cycle control device according to claim 1, wherein the control lever is configured and arranged as a brake lever for bicycle braking operation.

18. A bicycle control device comprising:
   a control lever; and
   a lever bracket movably supporting the control lever, the lever bracket including
      a bracket body with a bicycle mounting portion and a control lever mounting portion, and an electrical connector housing being movably supported on the bracket body between a retracted position and an accessible position;

the control lever is a cable operated lever that is pivotally mounted to the control lever mounting portion of the bracket body, and the control lever includes a cable attachment structure, and the electrical connector housing includes a plurality of electrical contact holes that extend longitudinally between the bicycle mounting portion and the control lever mounting portion when the electrical connector housing is in the retracted position.

19. A bicycle control device comprising:

a control lever; and a lever bracket movably supporting the control lever, the lever bracket including a bracket body with a bicycle mounting portion and a control lever mounting portion, and an electrical connector housing being movably supported on the bracket body between a retracted position and an accessible position;

the electrical connector housing is configured and arranged to receive an electrical connector and an auxiliary electrical connector, and each of the electrical connector and the auxiliary electrical connector includes a plurality of electrical contact holes that extend longitudinally between the bicycle mounting portion and the control lever mounting portion when the electrical connector housing is in the retracted position.

* * * * *